US009783174B2

United States Patent
Imai et al.

(10) Patent No.: US 9,783,174 B2
(45) Date of Patent: Oct. 10, 2017

(54) ELECTRIC PARKING BRAKE CONTROL DEVICE, CONTROL METHOD AND CONTROL PROGRAM, AND BRAKE SYSTEM

(71) Applicant: AKEBONO BRAKE INDUSTRY CO., LTD., Tokyo (JP)

(72) Inventors: Misako Imai, Tokyo (JP); Hidekazu Hori, Tokyo (JP); Hideki Kakizaki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/376,682

(22) PCT Filed: Feb. 6, 2013

(86) PCT No.: PCT/JP2013/052723
§ 371 (c)(1),
(2) Date: Aug. 5, 2014

(87) PCT Pub. No.: WO2013/118770
PCT Pub. Date: Aug. 15, 2013

(65) Prior Publication Data
US 2015/0019099 A1    Jan. 15, 2015

(30) Foreign Application Priority Data
Feb. 7, 2012  (JP) ................................. 2012-024242

(51) Int. Cl.
*B60T 8/172*  (2006.01)
*B60T 8/171*  (2006.01)
(Continued)

(52) U.S. Cl.
CPC ................ *B60T 8/172* (2013.01); *B60T 7/02* (2013.01); *B60T 7/042* (2013.01); *B60T 7/085* (2013.01);
(Continued)

(58) Field of Classification Search
CPC .......... B60T 8/172; B60T 13/741; B60T 7/02; B60T 8/71; B60T 8/171
(Continued)

(56) References Cited

U.S. PATENT DOCUMENTS 6,270,172 B1   8/2001  Shirai et al.
2001/0033106 A1  10/2001  Shirai et al.
(Continued)

FOREIGN PATENT DOCUMENTS

CN    1898110 A    1/2007
CN    101460346 A   6/2009
(Continued)

OTHER PUBLICATIONS

Notification of First Office Action issued Jan. 28, 2016 in corresponding Chinese Patent Application No. 201380008465.5 (7 pages) with an English Translation (11 pages).
(Continued)

*Primary Examiner* — Yazan Soofi
(74) *Attorney, Agent, or Firm* — Drinker Biddle & Reath LLP (57) ABSTRACT

A control device for an electric parking brake controls a motor for driving a friction member of the electric parking brake. The control device includes a processing unit which starts the motor in order to drive the friction member to a direction for placing the electric parking brake in a locked state; measures a current value of the motor in an operating state thereof; determines a cut-off current value from the measured current value of the motor according to a prede-
(Continued)

termined rule defining a correlation between the cut-off current value of the motor, by which a braking force necessary for the electric parking brake in the locked state is generated, and an increasing rate of the current; and stops the motor when the current value of the motor reaches the determined cut-off current value.

6 Claims, 5 Drawing Sheets

(51) Int. Cl.
| | | |
|---|---|---|
| B60T 7/02 | (2006.01) |
| B60T 7/12 | (2006.01) |
| B60T 13/74 | (2006.01) |
| F16D 65/14 | (2006.01) |
| F16D 65/18 | (2006.01) |
| F16D 65/22 | (2006.01) |
| B60T 7/04 | (2006.01) |
| B60T 7/08 | (2006.01) |
| F16D 121/24 | (2012.01) |

(52) U.S. Cl.
CPC ............... *B60T 7/12* (2013.01); *B60T 8/171* (2013.01); *B60T 13/741* (2013.01); *F16D 65/14* (2013.01); *F16D 65/18* (2013.01); *F16D 65/22* (2013.01); *F16D 2121/24* (2013.01)

(58) Field of Classification Search
USPC .......................................................... 701/70
See application file for complete search history.

(56) References Cited

U.S. PATENT DOCUMENTS

| 2005/0046271 A1* | 3/2005 | Suzuki | B60T 13/741 |
| | | | 303/20 |
| 2006/0261764 A1* | 11/2006 | Erben | B60T 7/045 |
| | | | 318/139 |
| 2008/0097675 A1* | 4/2008 | Konishi | B60T 8/885 |
| | | | 701/75 |
| 2009/0186744 A1 | 7/2009 | Reitmeier | |
| 2009/0200976 A1 | 8/2009 | Watanabe et al. | |
| 2010/0308645 A1* | 12/2010 | Maron | B60T 13/588 |
| | | | 303/20 |

FOREIGN PATENT DOCUMENTS

| CN | 101835665 A | 9/2010 |
| DE | 10 2004 036 476 A1 | 3/2005 |
| DE | 103 61 042 B3 | 5/2005 |
| JP | S59-177550 U | 11/1984 |
| JP | H11-43041 A | 2/1999 |
| JP | 3466216 B2 | 11/2003 |
| JP | 2007-515344 A | 6/2007 |
| JP | 2009-190503 A | 8/2009 |
| JP | 2009-538777 A | 11/2009 |
| JP | 2011-500433 A | 1/2011 |

OTHER PUBLICATIONS

Notification of Second Office Action issued Oct. 8, 2016 in Chinese Patent Application No. 201380008465.5 (3 pages) with an English Translation (4 pages).
Extended European Search Report issued Jun. 7, 2016 in European Patent Application No. 13747285.8.
Notification of Third Office Action issued Apr. 12, 2017 in Chinese Patent Application No. 201380008465.5 (8 pages), along with its English-language Translation (11 pages).

* cited by examiner

ELECTRIC PARKING BRAKE CONTROL DEVICE, CONTROL METHOD AND CONTROL PROGRAM, AND BRAKE SYSTEM

TECHNICAL FIELD

The present invention relates to a control device, a control method and a control program for an electric parking brake and a brake system.

BACKGROUND ART

In recent years, the tendency of electrically driving a brake for braking a vehicle has been progressing in accordance with the development of the electronic control technique.

CITATION LIST

Patent Literature

[PTL 1] JP-A-2009-190503
[PTL 2] JP-T-2007-515344
[PTL 3] JP-A-11-43041
[PTL 4] Japanese Patent No. 3466216
[PTL 5] JP-T-2011-500433

SUMMARY OF INVENTION

Technical Problem

In the electric parking brake, when a current flowing to a motor for driving a friction member is interrupted at an early timing, the friction member is pressed slightly against a disc or a drum. Thus, since a friction force between the friction member and the disc or the drum becomes small, a sufficient braking force cannot be generated. In contrast, when the current flowing to the motor is interrupted at a late timing, since the friction member and the disc or the drum are mutually pressed excessively, the mechanism of the electric parking brake may malfunction. Thus, in the electric parking brake, it is required to apply a sufficient load to the friction member by means of the motor to thereby act a sufficient friction force on both the friction member and the disc or the drum so that a braking force required during the parking is generated. Further, it is required to interrupt the current flowing to the motor at a suitable timing so that the mechanism of the electric parking brake, for example, the motor or the driving system thereof does not malfunction.

As a means for determining a timing for interrupting the current flowing to the motor, there is one based on sensors for measuring a load. However, the addition of various kinds of sensors for measuring the load results in the complication of the configuration and control of a system. Further, as another means for determining the timing for interrupting the current flowing to the motor, there is one which determines based on a changing rate of the current flowing to the motor. However, the changing rate of the motor current may vary depending on the state of the motor or the driving system thereof as well as the friction force between the friction member and the disc or the drum. Thus, it is impossible to determine, only based on the changing rate of the motor current, whether or not a required braking force is obtained. As a result, it is difficult to interrupt the current flowing to the motor at a suitable timing.

This invention has been developed in view of the aforesaid circumstances. An object of this invention is to provide a control device for an electric parking brake, a control method therefor, a control program therefor and a brake system, each of which can interrupt a current flowing to a motor at a suitable timing without complicating the configuration of a system.

Solution to Problem

In order to solve the aforesaid problem, according to this invention, a cut-off current value is determined from a measured current value of a motor in accordance with a predetermined rule defining a correlation between a cut-off current value and an increasing rate of a current, and the motor is stopped according to the cut-off current value thus determined.

In detail, a control device for an electric parking brake controls a motor for driving a friction member of the electric parking brake. The control device includes a processing unit which starts the motor in order to drive the friction member to a direction for placing the electric parking brake in a locked state; measures a current value of the motor in an operating state thereof; determines a cut-off current value from the measured current value of the motor according to a predetermined rule defining a correlation between the cut-off current value of the motor, by which a braking force necessary for the electric parking brake in the locked state is generated, and an increasing rate of the current; and stops the motor when the current value of the motor reaches the determined cut-off current value.

A part of a driving power which is transmitted when the motor moves is lost in a driving system transmitting the power. In the case of the parking brake, except for a power lost in the driving system, a power required only for pressing the friction member against a disc or a drum is almost constant. In view of this, a phenomenon, that the value of a current flowing during the operation of the motor for the electric parking brake increases or decreases as compared with the usual, is considered to be caused by the increase/decrease of the friction coefficient of the driving system, that is, the increase/decrease of the power lost in the driving system. According to this consideration, when the cut-off current is made constant, the braking force generated by the electric parking brake in the locked state thereof changes depending on the increase/decrease of the power lost in the driving system.

When an amount of the power loss in the driving system is large, since a load larger than the usual is applied to the motor, the increasing rate of the motor current just after starting the motor is larger than the usual. In contrast, when an amount of the power loss in the driving system is small, since a load smaller than the usual is applied to the motor, the increasing rate of the motor current just after starting the motor is smaller than the usual.

Thus, the control device determines a final cut-off current value from a measured motor current value, according to a predetermined rule defining a correlation between an increasing rate of the motor current and a suitable cut-off current value. The predetermined rule defines the correlation between the cut-off current value of the motor, by which a braking force necessary in the locked state of the electric parking brake is exerted, and the increasing rate of the motor current. For example, this rule is obtained at every specification of the motor and the driving system constituting the electric parking brake, and defined by a function, a map, a table etc.

According to the aforesaid control device for the electric parking brake, the current flowing to the motor can be interrupted at a suitable timing. Further, since the timing for interrupting the current flowing to the motor is determined based on the motor current, the configuration of a system can be prevented from being complicated.

The processing unit may be configured to start the motor in order to drive the friction member to the direction for placing the electric parking brake in the locked state; measure, during plural time periods, the current value of the motor in the operating state thereof; determine the cut-off current value from an average value of the measured current values of the motor calculated during each of the plural time periods, according to the predetermined rule; and stop the motor when the current value of the motor reaches the determined cut-off current value. When the processing unit is configured in this manner, since an amount of error contained in the data of the measured motor current values is reduced, the cut-off current value can be determined more accurately.

Further, this invention can also be applied to a control method and a control program each for executing the processing performed by the control device for the electric parking brake. Furthermore, this invention can also be applied to the brake system provided with the electric parking brake and the control device.

Advantageous Effects of Invention

According to this invention, the current flowing to the motor can be interrupted at a suitable timing. Further, since the timing for interrupting the current flowing to the motor is determined based on the motor current, the system configuration can be prevented from being complicated.

DESCRIPTION OF EMBODIMENTS

Hereinafter, an embodiment according to this invention will be explained. The embodiment described below exemplarily shows one mode according to this invention and the technical range of this invention is not limited to the following mode.

Figure 1:
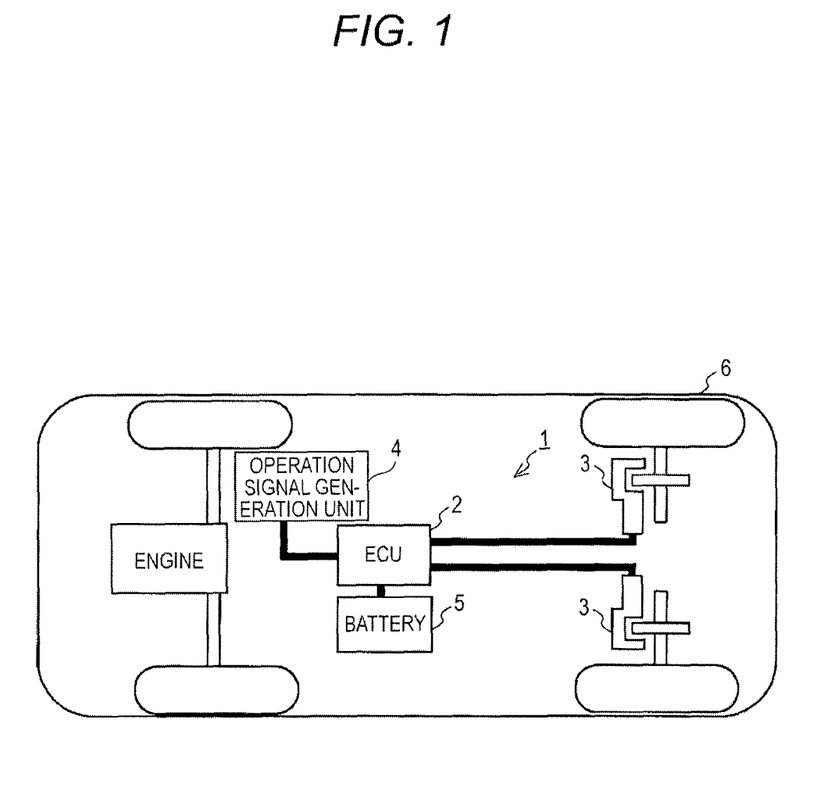
FIG. 1 is a diagram showing the configuration of a brake system according to an embodiment.

FIG. 1 is a diagram showing the configuration of a brake system 1 according to this embodiment. The brake system 1 includes an ECU (Electronic Control Unit) 2, electric parking brakes 3 and an operation signal generation unit 4. The brake system is operated by being supplied with electric power from a battery 5. FIG. 1 shows the two electric parking brakes 3 in corresponding to left and right wheels, respectively, on the assumption that the brake system 1 is mounted on a vehicle 6. However, the brake system 1 is not limited to such a mode but may include only one electric parking brake 3 or at least three electric parking brakes.

The ECU 2 is an electronic control device including a processor, memories and an input/output interface. The ECU executes computer programs stored in the memory to thereby realize the control of the electric parking brakes 3 according to signals transmitted from the operation signal generation unit 4.

Each of the electric parking brakes 3 is an electric parking brake which is operated by being supplied with electric power from the ECU 2. That is, in each of the electric parking brakes 3, when being supplied with electric power from the ECU 2, a motor contained therein is rotated to thereby move a brake shoe provided with a friction member. Each of the electric parking brakes 3 may be a disc brake or a drum brake.

The operation signal generation unit 4 is a change-over switch which changes the state of each of the electric parking brakes 3 between a locked state and an unlocked state. The operation signal generation unit is disposed at a position near a driver's seat operable by a driver.

Figure 2:
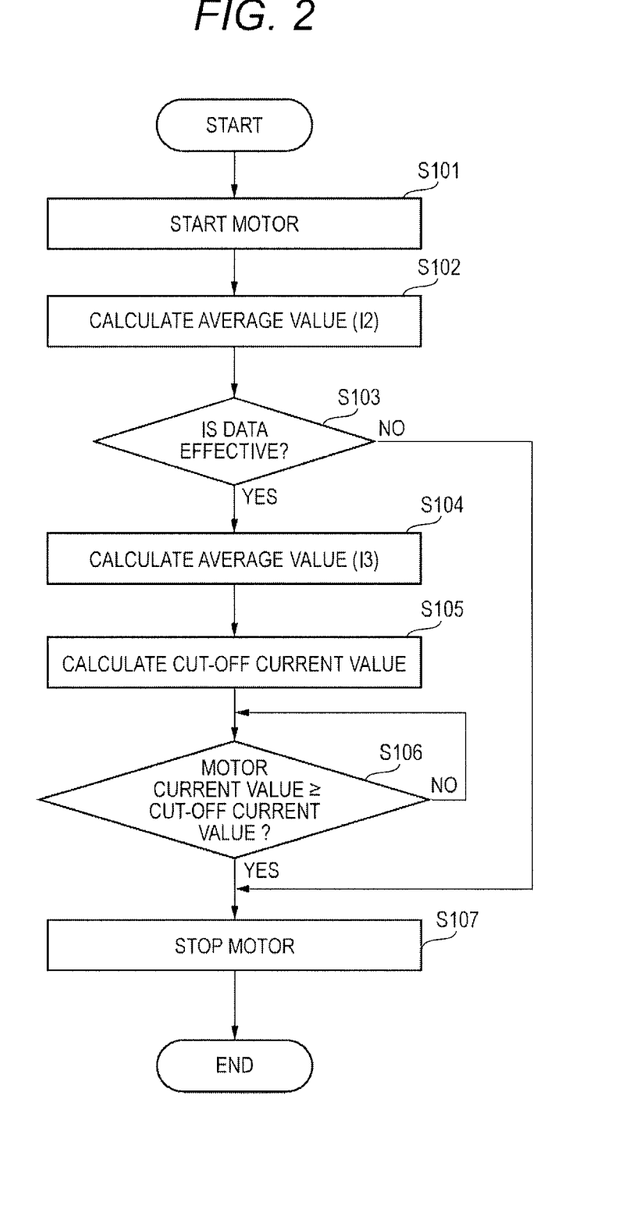
FIG. 2 is a flowchart showing a processing executed in the brake system according to the embodiment.

Hereinafter, the explanation will be made as to a processing realized in the brake system 1. FIG. 2 is a flowchart of a processing which is realized in a case where the operation signal generation unit 4 is operated by a driver in the unlocked state of each of the electric parking brakes 3 to thereby shift each of the electric parking brakes 3 to the locked state from the unlocked state. This processing realized in the case of shifting the electric parking brake 3 to the unlocked state from the locked state is same as the processing which is realized in the generally-spread electric parking brake. Thus, the explanation of this processing will be omitted.

Figure 3:
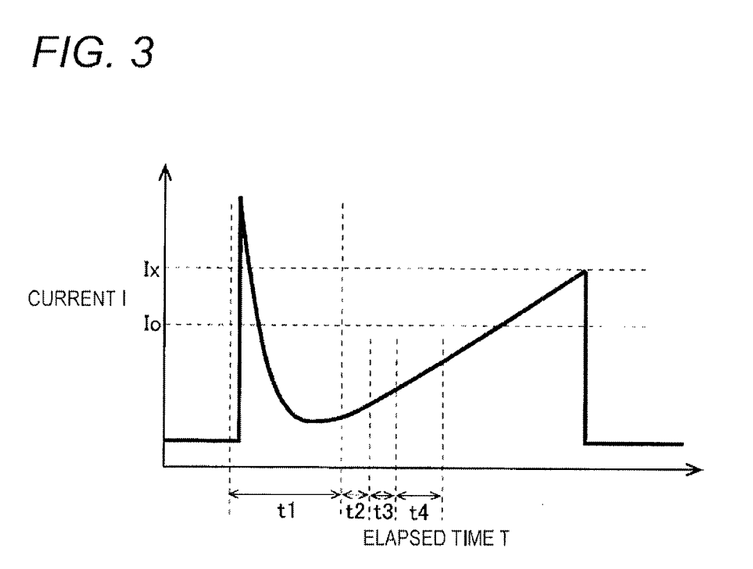
FIG. 3 is a graph showing the change of an amount I of a motor current with respect to an elapsed time T.

(Step S101) In the unlocked state of each of the electric parking brakes 3, when the operation signal generation unit 4 is operated by a driver, the ECU 2 starts the electric motor contained within each of the electric parking brakes 3 to thereby rotate each of the motors to a direction placing the corresponding electric parking brake 3 in the locked state. FIG. 3 is a graph showing the change of an amount I of a current (hereinafter simply referred to a motor current) flowing into the motor contained in the electric parking brake 3, with respect to an elapsed time T. The amount of the motor current once decreases after a rush current flows just after the start and then increases again. The amount of the motor current increases when the brake shoe provided with the friction member starts moving and further increases when the brake shoe is pressed against a disc or a drum.

Time periods (t1, t3, t4) shown in FIG. 3 are prescribed in advance. That is, the time period (t1) is prescribed in order to set a period during which data of the rush current and a current in a slipping state is not contained, in an arithmetic processing described later. In other words, the time period (t1) is a period which is considered to be required until a driving system is operated stably after the motor is released from a transient state just after the starting. The time period (t3) is a period prescribed in order to detect the changing amount of the motor current. To be concrete, the time period (t3) is a period which is necessary for obtaining a given number of samples of the current value data required for obtaining an average value thereof so that an error contained in the current value data of the electric motor does not influence on the result of the arithmetic processing described later. Further, the time period (t4) is an arithmetic processing period necessary for calculating a cut-off current value which is a condition at the time of stopping the electric motor. A time period (t2) shown in FIG. 3 is a period for performing a determination (prediction), based on the average value of the motor current, that the time period (t3) becomes a period during which an axial force is surely generated.

(Step S102) When the prescribed time period (t1) elapses after the operation signal generation unit 4 is operated, the ECU 2 calculates an average value (I2) of the motor current during 50 msec, for example, within the time period (t2). The number of samples depends on a sampling cycle of an analog-to-digital (A/D) converter for sampling the motor current. Then, the ECU 2 divides an integration value of the motor current sampled within the time period (t2) by the number of samples to thereby obtain the average value (I2) of motor current. The calculation processing of the average value (I2) of motor current is executed during a period after the time period (t2), that is, during the prescribed time period (t3) or (t4).

(Step S103) The ECU 2 determines based on the motor current value (I2) whether or not the brake axial force is surely generated. Then, when it is determined that the brake axial force is surely generated (step S103, YES), a process proceeds to a processing of calculating an average value (I3) of motor current (data is effective). In contrast, when it is determined not (Step S103, NO), the motor is stopped immediately. The ECU 2 determines whether or not the data is effective based on whether the motor current value (I2) is equal to or larger than a predetermined threshold value or smaller than the threshold value.

(Step S104) After the determination is made that the brake axial force is surely generated based on the measurement of the motor current value (I2), the ECU 2 calculates the average value (I3) of the motor current within the prescribed time period (t3). That is, the ECU 2 samples the motor current data until the prescribed time period (t3) elapses after the lapse of the time period (t2). Then, the ECU 2 divides an integration value of the motor current sampled within the prescribed time period (t3) by the number of samples to thereby obtain the average value (I3) of the motor current. The calculation processing of the average value (I3) of the motor current is executed during a period after the prescribed time period (t3), that is, during the prescribed time period (t4).

(Step S105) The ECU 2 calculates the cut-off current value of the motor within the time period (t4) based on the average value (I3) of motor current. The calculation of the cut-off current value is performed based on the following technical concept.

Figure 4:
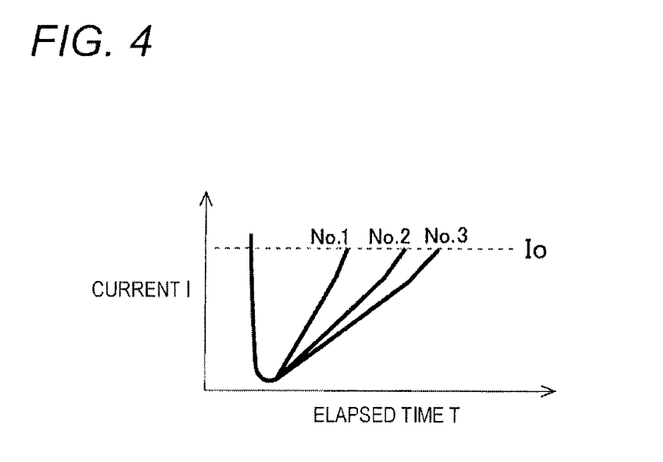
FIG. 4 is a diagram showing graphs each representing the change of the amount I of the motor current with respect to an elapsed time T, as to three cases where the friction coefficients of a driving system differ from one another, as an example.

FIG. 4 is a diagram showing graphs each representing the change of the amount I of the motor current with respect to an elapsed time T, as to three cases where the friction coefficients of the driving system of the electric parking brake 3 differ from one another, as an example. In the graph shown in FIG. 4, the friction coefficient of the driving system is excessive in a case 1 (No. 1), the friction coefficient of the driving system is proper in a case 2 (No. 2), and the friction coefficient of the driving system is too small in a case 3 (No. 3). In the case 1 where the friction coefficient of the driving system for driving the brake shoe is large, since a load applied to the motor after the termination of the slipping is larger as compared with the case 2, the increasing rate of the motor current is large. Thus, a time period required in the case 1 to reach a cut-off current value Io is short as compared with the case 2.

Figure 5:
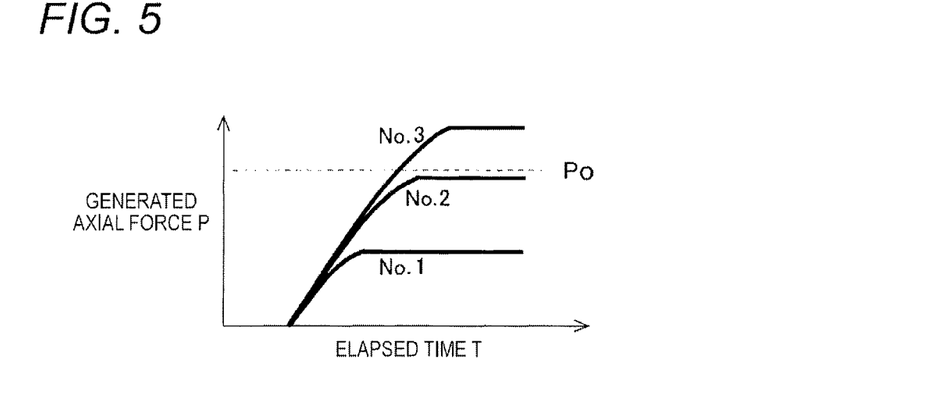
FIG. 5 is a diagram showing graphs each representing the change of a force P of a brake shoe for locking a wheel shaft with respect to an elapsed time T.

FIG. 5 is a diagram showing graphs each representing the change of a force of the brake shoe for locking the wheel shaft (hereinafter referred to a generated axial force P; this force can also be grasped as the braking force) with respect to an elapsed time T. In the case 1 where the friction coefficient of the driving system is large, an amount of a driving power lost in the driving system is larger as compared with the case 2. Thus, of the driving power outputted from the motor, a rate of the driving power transmitted to the brake shoe becomes small. Therefore, in a case where the cut-off current value Io is constant as shown in FIG. 4, an amount of the final generated axial force P, which continues to lock the wheel shaft after the motor stops in the case 1, becomes smaller as compared with the case 2 as shown in FIG. 5. As a result, the generated axial force P cannot reach a target axial force Po required for each of the electric parking brakes 3.

Further, in the case 3 where the friction coefficient of the driving system is small, an amount of the driving power lost in the driving system is smaller as compared with the case 2. Thus, of the driving power outputted from the motor, the rate of the driving power transmitted to the brake shoe becomes large. Therefore, in the case where the cut-off current value is constant as shown in FIG. 4, an amount of the final generated axial force P, which continues to lock the wheel shaft after the motor stops in the case 3, becomes larger as compared with the case 2 as shown in FIG. 5. As a result, since an excessive force is applied to the brake shoe, there arises a possibility that the degradation of the brake shoe, the disc or the drum is accelerated or the brake shoe, the disc or the drum is broken.

Figure 6:
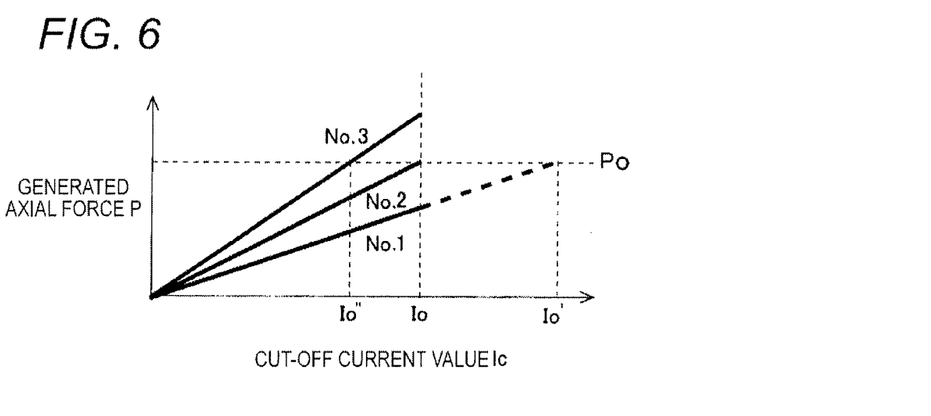
FIG. 6 is a diagram showing graphs each representing a relation between a cut-off current value Ic and a generated axial force P.

FIG. 6 is a diagram showing graphs each representing a relation between the cut-off current value Ic and the generated axial force P, as to each of the cases 1 to 3. According to the analysis performed by the inventors of this invention, as shown in FIG. 6, it will be understood that the relation between the cut-off current value and the generated axial force P is linear. From this graphs, the cut-off current value necessary for obtaining the target axial force Po can be specified as to each of the cases 1 to 3. The cut-off current value Io' necessary for obtaining the target axial force Po in the case 1 is larger than the cut-off current value Io in the case 2. The cut-off current value Io" necessary for obtaining the target axial force Po in the case 3 is smaller than the cut-off current value Io in the case 2.

Figure 7:
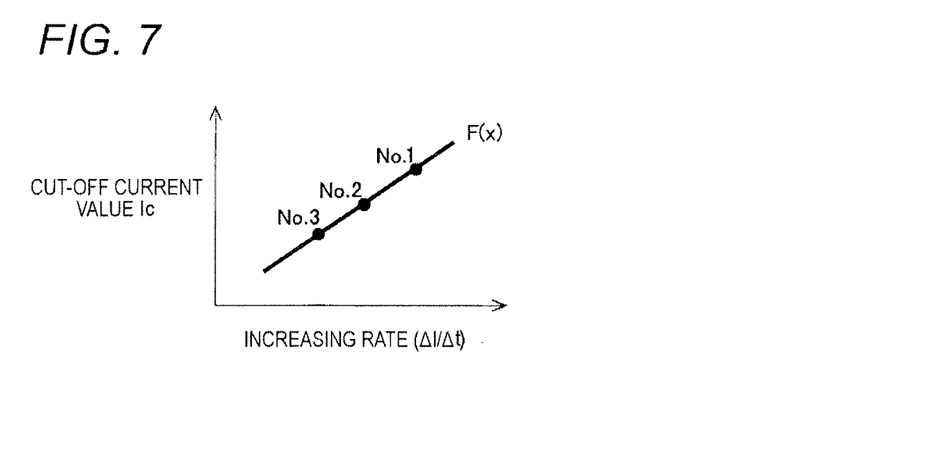
FIG. 7 is a graph showing a relation between the cut-off current value Ic and an increasing rate ($\Delta I/\Delta t$) of the motor current.

FIG. 7 is a graph showing a relation between the cut-off current value Ic and an increasing rate ($\Delta I/\Delta t$) of the motor current. This graph is formed by plotting the relation between the suitable cut-off current value specified from the graph of FIG. 6 and the increasing rate ($\Delta I/\Delta t$) of the motor current, as to each of the cases 1 to 3. From the positional relation of the plotted points in FIG. 7, it is estimated that the relation between the cut-off current value and the increasing rate ($\Delta I/\Delta t$) of the motor current is linear.

Then, the ECU 2 calculates a cut-off current value (Ix), for obtaining the prescribed target value as the generated axial force P, from the average value (I3) of the motor current calculated in the step S104 based on the aforesaid technical concept. That is, the ECU 2 inputs the average value (I3) of the motor current into a function F(x) defining the relation between the cut-off current value and the increasing rate (ΔI/Δt) of the motor current as shown in the graph of FIG. 7, to thereby calculate the optimum cut-off current value (Ix) obtainable the necessary generated axial force.

(Step S106) The ECU 2 determines, after the completion of the calculation of the cut-off current value (Ix), whether or not the motor current value reaches the cut-off current value (Ix).

(Step S107) The ECU 2 stops the motor when it detects that the motor current values reaches the cut-off current value (Ix). As a result, the electric parking brake 3 is placed in the locked state, and the ECU 2 completes a series of the processing.

Further, although not shown in FIG. 2, when a prescribed time period elapses after starting the motor while executing the processing from the step S101 to the step S106, the ECU 2 stops the motor irrespective of whether or not the motor current reaches the cut-off current value, in order to protect the motor.

Figure 8:
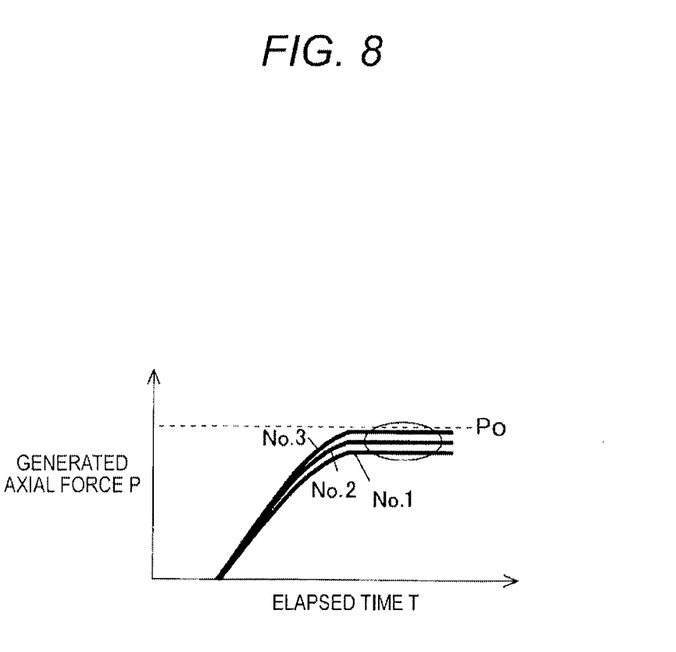
FIG. 8 is a diagram showing graphs each representing the change of the force P of the brake shoe for locking the wheel shaft with respect to an elapsed time T, in the brake system according to the embodiment.

FIG. 8 is a diagram showing graphs each representing the change of the force P of the brake shoe for locking the wheel shaft with respect to an elapsed time T, in the brake system 1. According to the brake system 1 of this embodiment, it is understood that the wheel shaft is locked by a force close to the target axial force Po, and hence the variance of the generated axial force P with respect to the target axial force Po becomes small. In FIG. 8, the generated axial forces P are converged within a range surrounded by a circle. According to the result of a simulation, the variance of the generated axial force P with respect to the target axial force Po is about ±10% in the brake system 1 according to this embodiment, while this variance in the case of the related art is about ±20%. In this manner, it is confirmed that the variance of the generated axial force P with respect to the target axial force Po becomes smaller in this embodiment. In the brake system 1 according to this embodiment, the wheel shaft is locked by the force close to the target axial force Po even when the friction coefficient of the driving system of the electric parking brake system 3 changes, so that the variance of the generated axial force P with respect to the target axial force Po becomes small. Thus, individual differences, aged deterioration and robustness with respect to the change of use environment of the motor and the mechanical components can be improved.

In the aforesaid embodiment, although the cut-off current value of the motor is determined based on the function F(x), the cut-off current value is not limited to one obtained based on the function. For example, a table or a map may be prepared in advance which defines a correlation between the cut-off current value of the motor, by which the braking force necessary for the electric parking brake 3 in the locked state is generated, and the increasing rate of the current. Then, the cut-off current may be determined by comparing the calculated average value (I3) of the motor current with the map.

Further, in the aforesaid embodiment, although the average values (I2, I3) of the motor current are calculated, this invention is not limited to such the embodiment. That is, the average value of the motor current may be calculated by another method. Further, alternatively, the increasing rate of the current may be directly calculated without averaging the current values.

The features of the embodiment of the control device for the electric parking brake, the control method therefor, the control program therefor and the brake system according to this invention will be briefly listed below as items [1] to [6].

[1] The control device (2) for the electric parking brake which controls the motor for driving the friction member of the electric parking brake (3), the control device (2) includes:

a processing unit which starts the motor in order to drive the friction member to a direction for placing the electric parking brake (3) in the locked state; measures a current value of the motor in the operating state thereof; determines a cut-off current value from the measured current value of the motor according to a predetermined rule defining the correlation between the cut-off current value of the motor, by which a braking force necessary in the locked state of the electric parking brake (3) is exerted, and an increasing rate of the current; and stops the motor when the current value of the motor reaches the determined cut-off current value.

[2] The control device (2) for the electric parking brake described in [1], wherein the predetermined rule is the function which defines the correlation between the cut-off current value of the motor, by which the braking force necessary for the electric parking brake (3) in the locked state is generated, and the increasing rate of the current.

[3] The control device (2) for the electric parking brake described in [1] or [2], wherein the processing unit starts the motor in order to drive the friction member to the direction for placing the electric parking brake (3) in the locked state; measures, during the plural time periods, the current value of the motor in the operating state thereof; determines the cut-off current value from the average value of the measured current value of the motor calculated during each of the plural time periods, according to the predetermined rule; and stops the motor when the current value of the motor reaches the determined cut-off current value.

[4] The control method for the electric parking brake which controls the motor for driving the friction member of the electric parking brake (3), the control method includes steps of:

starting the motor in order to drive the friction member to the direction for placing the electric parking brake (3) in the locked state;

measuring a current value of the motor in the operating state thereof;

determining the cut-off current value from the measured current value of the motor according to the predetermined rule defining the correlation between the cut-off current value of the motor, by which a braking force necessary for the electric parking brake (3) in the locked state is generated, and an increasing rate of the current; and stopping the motor when the current value of the motor reaches the determined cut-off current value.

[5] The control program for the electric parking brake which controls the motor for driving the friction member of the electric parking brake (3), the control program makes the control device (2) for controlling the motor execute processings of:

starting the motor in order to drive the friction member to the direction for placing the electric parking brake (3) in the locked state;

measuring a current value of the motor in the operating state thereof;

determining the cut-off current value from the measured current value of the motor according to the predetermined rule defining the correlation between the cut-off current value of the motor, by which a braking force necessary for the electric parking brake (3) in the locked state is generated, and an increasing rate of the current; and stopping the motor when the current value of the motor reaches the determined cut-off current value.

[6] The brake system (1) for parking, the brake system includes:

the electric parking brake (3) which drives the friction member of the brake by using the motor; and the control device (2) which starts the motor in order to drive the friction member to the direction for placing the electric parking brake in the locked state; measures a current value of the motor in the operating state thereof; determines the cut-off current value from the measured current value of the motor according to the predetermined rule defining the correlation between the cut-off current value of the motor, by which a braking force necessary for the electric parking brake in the locked state is generated, and an increasing rate of the current; and stops the motor when the current value of the motor reaches the determined cut-off current value.

Although this invention is explained in detail with reference to the particular embodiment, it will be apparent for those skilled in the art that various changes and modifications can be made without departing from the spirit and range of this invention.

The present application is based on Japanese Patent Application (Japanese Patent Application No. 2012-24242) filed on Feb. 7, 2012, the content of which is incorporated herein by reference.

INDUSTRIAL APPLICABILITY

According to this invention, the current flowing to the motor can be interrupted at a suitable timing. Further, since the timing for interrupting the current flowing to the motor is determined based on the motor current, the system configuration can be prevented from being complicated. This invention attaining such the effects is useful in a field relating to the control of the electric parking brake.

REFERENCE SIGNS LIST 1 brake system
2 ECU
3 electric parking brake
4 operation signal generation unit
battery
6 vehicle

The invention claimed is:

1. A control device for an electric parking brake which controls a motor for driving a friction member of the electric parking brake, the control device comprising:
a processor programmed to:
start the motor in order to drive the friction member to a direction for placing the electric parking brake in a locked state;
measure a current value of the motor in an operating state thereof;
determine a cut-off current value from the measured current value of the motor according to a predetermined rule defining a correlation between the cut-off current value of the motor, by which a braking force necessary in the locked state of the electric parking brake is exerted, and an increasing rate of the current; and
stop the motor when the current value of the motor reaches the determined cut-off current value,
wherein the correlation between the cut-off current value and the increasing rate of the current is obtained by plotting a plurality of coordinate points of the cut-off current value and the increasing rate of the current with respect to a plurality of friction coefficients of a driving system of the electric parking brake, and
wherein the correlation between the cut-off current value and the increasing rate of the current is positive and linear.

2. The control device for the electric parking brake according to claim 1, wherein the predetermined rule is a function which defines a correlation between the cut-off current value of the motor, by which the braking force necessary in the locked state of the electric parking brake is exerted, and an increasing rate of the current.

3. The control device for the electric parking brake according to claim 1, wherein the processor is further programmed to
start the motor in order to drive the friction member to the direction for placing the electric parking brake in the locked state;
measure, during plural time periods, the current value of the motor in an operating state thereof;
determine the cut-off current value from an average value of the measured current value of the motor calculated during each of the plural time periods, according to the predetermined rule; and
stop the motor when the current value of the motor reaches the determined cut-off current value.

4. A control method for an electric parking brake which controls a motor for driving a friction member of the electric parking brake, the control method comprising:
starting the motor in order to drive the friction member to a direction for placing the electric parking brake in a locked state;
repeatedly measuring a current value of the motor in an operating state thereof;
determining a cut-off current value from the measured current value of the motor according to a predetermined rule defining a correlation between the cut-off current value of the motor, by which a braking force necessary in the locked state of the electric parking brake is exerted, and an increasing rate of the current;
comparing the measured current value to the determined cut-off current value; and
stopping the motor when the current value of the motor reaches the determined cut-off current value,
wherein the correlation between the cut-off current value and the increasing rate of the current is obtained by plotting a plurality of coordinate points of the cut-off current value and the increasing rate of the current with respect to a plurality of friction coefficients of a driving system of the electric parking brake, and
wherein the correlation between the cut-off current value and the increasing rate of the current is positive and linear.

5. A non-transitory computer readable medium comprising a control program for an electric parking brake which controls a motor for driving a friction member of the electric parking brake, the control program making a control device for controlling the motor execute processes of:
starting the motor in order to drive the friction member to a direction for placing the electric parking brake in a locked state;
measuring a current value of the motor in an operating state thereof;
determining a cut-off current value from the measured current value of the motor according to a predetermined rule defining a correlation between the cut-off current value of the motor, by which a braking force necessary for the electric parking brake in the locked state is generated, and an increasing rate of the current; and stopping the motor when the current value of the motor reaches the determined cut-off current value, wherein the correlation between the cut-off current value and the increasing rate of the current is obtained by plotting a plurality of coordinate points of the cut-off current value and the increasing rate of the current with respect to a plurality of friction coefficients of a driving system of the electric parking brake, and wherein the correlation between the cut-off current value and the increasing rate of the current is positive and linear.

6. A brake system for parking, the brake system comprising:

an electric parking brake which drives a friction member of a brake by using a motor; and a control device programmed to:

start the motor in order to drive the friction member to a direction for placing the electric parking brake in a locked state;

measure a current value of the motor in an operating state thereof;

determine a cut-off current value from the measured current value of the motor according to a predetermined rule defining a correlation between the cut-off current value of the motor, by which a braking force necessary for the electric parking brake in the locked state is generated, and an increasing rate of the current; and stop the motor when the current value of the motor reaches the determined cut-off current value, wherein the correlation between the cut-off current value and the increasing rate of the current is obtained by plotting a plurality of coordinate points of the cut-off current value and the increasing rate of the current with respect to a plurality of friction coefficients of a driving system of the electric parking brake, and wherein the correlation between the cut-off current value and the increasing rate of the current is positive and linear.

* * * * *